Patented Jan. 30, 1934

1,944,938

UNITED STATES PATENT OFFICE 1,944,938

ENAMELING COMPOSITION

Charles J. Kinzie, Niagara Falls, N. Y., assignor to The Titanium Alloy Manufacturing Company, New York, N. Y., a corporation of Maine No Drawing. Application April 10, 1930
Serial No. 443,251

4 Claims. (Cl. 106—36.2)

My invention relates more particularly to improved enameling compositions in which zirconium compounds are used as opacifiers not only when smelted into the enamel frit but also when thereafter added at the mill for producing the coating for the finally vitrified enamel articles, and my improved compositions are particularly adapted for enameling sheet metal.

In enameling sheet iron and steel articles by the usual procedure, the practice has been to prepare the enamel frit either in form of essentially a clear glass or to impart some opacity to it by including in the smelting both antimony compounds and fluorides. In the milled enamel two materials are present that are chiefly responsible for opacity in the final enamel, one being the particles in the glass itself such as fluorides and antimony compounds, the other being the opacifier pigment added at the mill as a suspended pigment separate from the glass yet intimately mixed mechanically therewith.

In the methods of enameling in common use great difficulties are experienced both from overheating, underheating or irregular heating in the firing of the coated articles, whereby opacity and a smooth lustrous surface are somewhat lost particularly where two or three coats are applied or where a tinted or colored enamel is to be produced.

These difficulties may be summarized as being due primarily to a too low degree of opacity, and to a certain instability of the usual high fluoride and antimony containing glasses, and also to the effect of these glasses upon the opacifier added at the mill when the enamel is subjected to too intense a heat.

It has been found in practice that it is not possible to produce the required opacity by the old and now usually followed methods, and also that the commonly used enamel glasses are not as stable toward the mill-added opacifiers as might be desired. However it has not been found possible to overcome these enamel defects for the reason that if the enamel is loaded with fluorides and antimony to produce an intense opacity in the glass, the glass is still more unstable and the final enamel lacks too much in lustre. If, on the other hand, a sufficient amount of opacifier is added at the mill to the usual glass or frit, the lustre is also impaired and other undesirable properties result.

It has been realized for a long time that an enamel on metal should be as resistant as possible to mechanical impact, distortion of shapes, etc.; that the thinner the enamel could be applied the greater would be the resistance of that enamel to mechanical abuses. However with the limited opacity of the usual enamels, it has been impossible to apply the coats thin enough, and at same time produce an enamel coating of sufficient covering power or opacity to answer trade requirements.

Summarizing the enamel properties of those enamels now in general use the following defects should be noted:

(A) That they have too low an opacity to permit thin coatings;

(B) That they are not as resistant to change in heat treatment as is desirable, and tend to change or become lower in covering power upon continued heating or upon reheating; and (C) That such enamels are not generally as mechanically strong as might be desired, and due to inherent relatively low opacity can not be applied in thin coats, and therefore the enamel as produced has too great a tendency to fail due to the cover enamel coat becoming fractured in mounting of enameled pieces upon stoves, for example, and during handling before and after this mounting operation and also during use.

I have discovered a method by which enamel glasses can be produced which fulfill the requirements of exceptionally great inherent opacity in the glass, and, when milled with moderate amounts of mill added opacifier (zirconia), will produce enamels so opaque that coatings as low as 0.25 grams per sq. in. can be used in production of commercial ware. I also make it possible to apply such thin coatings that a great gain in mechanical strength is obtained. In addition to this the enamel itself has a greater strength than that of the commonly used enamels, and coupled with the now possible thinner coatings, makes this new enameling material especially desirable for commercial enameling.

These new enameling compositions are distinguished from prior enameling processes and compounds in other ways. For instance, the improved enamel coatings will withstand a degree of overfiring or burning abuse which would ruin the usual enamel. This heretofore unknown degree of stability under fire has an important bearing upon economies of enameling in its relation to production of uniform ware both in whites and in colors.

Likewise in my new enameling compounds so much of the opacity is contributed in forming the frit or glass that the enamel on finished article has a more uniform texture than heretofore; also my new enamels are exceptionally stable toward the mill added opacifier (particularly zirconia), and this has an important bearing upon the ability of these new products to withstand a heretofore unknown degree of overfire with resultant important economies in practice.

My new and improved enameling compositions are practical for both wet process and dry enameling and the frit possesses exceptional opacity with great strength and stability resulting in important economies in manufacture as well as improved qualities in the enamel ware produced for ordinary use.

The following examples will serve to show how my new enameling compositions may be made and the manner of their use.

*Example A*

The following raw enameling materials are weighed out and mixed, and when weighed out and mixed constitute the raw batch as introduced into the smelting furnace.

| | Parts by weight |
|---|---|
| Sodium zirconium silicate (*) | 26.43 |
| Aluminum hydrate | 1.64 |
| Feldspar (**) | 30.05 |
| Sodium nitrate | 3.50 |
| Borax | 23.46 |
| Boric acid | 9.00 |
| Fluorspar | 6.22 |
| Cryolite | 3.96 |
| Zinc oxide | 13.87 |
| Raw Wgt | 118.13 |

(*) Sodium zirconium silicate has the following analysis:

| | Percent |
|---|---|
| $ZrO_2$ | 55.95 |
| $SiO_2$ | 28.40 |
| $Al_2O_3 + P_2O_5$ | 1.48 |
| $Fe_2O_3$ | 0.09 |
| $TiO_2$ | 0.10 |
| $Na_2O$ | 13.90 |
| $H_2O$ | 0.08 |
| | 100.00 |

(**) Feldspar has the following analysis:

| | Percent |
|---|---|
| $SiO_2$ | 64.99 |
| $Al_2O_3$ | 19.74 |
| $K_2O$ | 12.52 |
| $Na_2O$ | 2.01 |
| | 99.26 |

The mix as described is now charged to a suitable smelting furnace. I prefer a rotary batch smelting furnace, which has been heated to about 1850–2000° F., the temperature at start can be about 2000° F. and when the raw materials are nearly all melted down the temperature should be lowered to about 1900° F., and maintained at about this point during the operation. The charge which now is fluid will for a short period continue to react and give off bubbles of gas, but will after a period quiet down and the surface of this charge will be relatively smooth and quiet. This quiet fusion is heated for about 20 to 30 minutes at temperature not higher than 1950 F., and then is poured into an ample supply of water to form the quenched and shattered glass constituting the enamel frit.

This frit as prepared above is intensely opaque and has the following calculated chemical composition:

| | Percent |
|---|---|
| $Na_2O$ | 9.34 |
| $K_2O$ | 3.76 |
| $CaF_2$ | 6.22 |
| $Na_3AlF_6$ | 3.96 |
| $ZnO$ | 13.87 |
| $B_2O_3$ | 13.67 |
| $SiO_2$ | 27.04 |
| $Al_2O_3$ | 7.39 |
| $ZrO_2$ | 14.79 |
| | 100.00 |

The enamel frit may now be prepared for enameling metal in following manner.

The frit is charged to a ball mill, along with suitable clay and opacifiers, coloring oxides, etc., depending upon whether white or colored enamel ware is desired. For white enamel a suitable mill charge may be as follows:—

| | Parts by weight |
|---|---|
| Frit | 100 |
| Enamelers clay | 6 |
| Zirconium oxide | 4 |
| Water, about | 35 |

The mill is closed and the charge milled until a suitable fineness is attained which for refrigerator work should be about 12 grams residue on 200 mesh from 100 c. c. sample, and for stove parts and the like about 7 grams residue on same test. The mill is discharged of its milled enamel using only enough added water to effectively remove the major part of charge. The slip now formed is placed in a suitable container and allowed to stand for about 24–48 hours, and is then adjusted to a consistency suitable for the particular type of work in hand.

The ware previously coated with the usual dark colored ground coat can be enameled with my new enameling product in the following manner.

The enamel slip is applied at such a rate as to yield about 0.25 grams enamel per sq. in. (dry), and is burned, and with this single coat and one burning operation, a finished piece of ware is produced. This would not be possible with the commonly used and less opaque enamels for the reason that it is not practical to apply enamel in a single heavier coat. Therefore my new compositions make it possible to produce in one cover coat enamel operation the same result as obtained in the common two cover coat operations and with less enamel, about one half of the amount of enamel, due to the greater opacity of my new glass frits or enameling compositions.

My improved enameling compositions are also illustrated in the following Examples B—F, the figures in the raw batches representing parts by weight in compounding the ingredients for the mix.

| Examples | B | C | D | E | F |
|---|---|---|---|---|---|
| Sodium Zirconium Silicate | 10.57 | 25.02 | 25.85 | 28.24 | 42.26 |
| Aluminum Hydrate | 2.40 | None | 2.87 | None | None |
| Feldspar | 28.89 | 33.65 | 48.00 | 25.96 | None |
| Quartz | 14.22 | 6.61 | 0.07 | None | 23.83 |
| Sodium Carbonate | None | 6.28 | 2.39 | 5.56 | 10.53 |
| Sodium Nitrate | 3.50 | 3.50 | 5.00 | 3.50 | 3.50 |
| Calcium Carbonate | None | None | None | None | 7.91 |
| Cryolite | 3.96 | 6.65 | None | None | None |
| Zinc Oxide | 13.87 | 6.65 | 4.50 | 12.00 | 4.20 |
| Fluorspar | 6.22 | None | 11.00 | 5.00 | 4.67 |
| Borax | 37.35 | 31.42 | 27.00 | 46.50 | 25.20 |
| Boric Acid | None | None | None | None | None |
| Raw Total | 120.98 | 119.78 | 126.68 | 126.76 | 122.10 |
| Melted Total | 100.00 | 100.00 | 108.19 | 100.00 | 100.00 |

Calculated percentage composition

| | | | | | |
|---|---|---|---|---|---|
| $Na_2O$ | 9.84 | 14.18 | 11.94 | 16.88 | 17.38 |
| $K_2O$ | 3.58 | 4.21 | 5.50 | 3.22 | None |
| $CaF_2$ | 6.22 | None | 10.17 | 5.00 | 4.67 |
| CaO | | 0.22 | None | None | 4.43 |
| $Na_3AlF_6$ | 3.96 | 6.65 | None | None | None |
| ZnO | 13.87 | 6.65 | 4.16 | 12.00 | 4.20 |
| $B_2O_3$ | 13.67 | 11.50 | 9.13 | 17.02 | 9.22 |
| $SiO_2$ | 35.86 | 35.59 | 35.46 | 24.80 | 35.83 |
| $Al_2O_3$ | 7.00 | 7.00 | 10.07 | 5.30 | 0.58 |
| $ZrO_2$ | 6.00 | 14.00 | 13.57 | 15.78 | 23.69 |
| | 100.00 | 100.00 | 100.00 | 100.00 | 100.00 |

The range of ingredients in the raw batches as illustrated in the group of six Examples A—F is as follows:—

| | Parts by weight |
|---|---|
| Sodium zirconium silicate | 10.57 to 42.26 |
| Aluminum hydrate | 0 to 2.87 |
| Flourspar | 0 to 11.00 |
| Quartz | 0 to 23.83 |
| Sodium carbonate | 0 to 10.53 |
| Sodium nitrate | 3.5 to 5.00 |
| Calcium carbonate | 0 to 7.91 |
| Cryolite | 0 to 6.65 |
| Zinc oxide | 4.20 to 13.87 |
| Flourspar | 0 to 11.00 |
| Borax | 23.46 to 46.50 |
| Boric acid | 0 to 9.00 |

The feldspar used in Examples B, D and E had the following composition.

| | Per cent |
|---|---|
| Silica ($SiO_2$) | 64.65 |
| Alumina ($Al_2O_3$) | 18.80 |
| Potassium oxide ($K_2O$) | 12.40 |
| Sodium oxide ($Na_2O$) | 3.49 |

The sodium zirconium silicate used in Examples B and D was of the following approximate composition.

| | Per cent |
|---|---|
| $ZrO_2$ | 56.76 |
| $SiO_2$ | 28.15 |
| $Na_2O$ | 14.24 |

The sodium zirconium silicate used in Examples C—F was of the composition heretofore given in Example A.

With these new enameling compositions, it has also been possible to dispense with the usual dark ground coat composition and apply my new compositions directly to the metal. I have produced enameled ware which was white and had only one coat of enamel applied directly to the metal. This is made possible by the great opacity of my new enameling compositions and also the greater inherent strength and adhering properties which assist greatly in the accomplishment of this result.

I claim as my invention:—

1. An enameling or glazing composition for direct application on metal initially comprising in the raw batch the following ingredients substantially in parts by weight viz: sodium zirconium silicate 10 to 43; aluminum hydrate 0 to 3; potash feldspar 0 to 48; quartz 0 to 24; sodium carbonate 0 to 11; sodium nitrate 3 to 5; calcium carbonate 0 to 8; cryolite 0 to 7; zinc oxide 4 to 14; fluorspar 0 to 11; and borax 23 to 47.

2. An opaque enameling or glazing composition for direct application on metal initially comprising in the raw batch the following ingredients substantially in parts by weight viz: sodium zirconium silicate 26.43; aluminum hydrate 1.64; potash feldspar 30.05; sodium nitrate 3.50; borax 23.46; boric acid 9.00; fluorspar 6.22; cryolite 3.96; and zinc oxide 13.87.

3. An enameling or glazing composition for direct application on metal comprising a fusible enamel frit having a silica content from 24 to 36%; an alumina content not to exceed 10%; a zirconia content 6 to 24%; a zinc oxide content 4 to 14%; a boric anhydride content 9 to 17%; and a sodium oxide content 9 to 18%.

4. An opaque enameling or glazing composition for direct application on metal comprising a fusible enamel frit having a silica content of about 27%; an alumina content about 7%; sodium oxide about 9%; potassium oxide about 4%; calcium fluoride about 6%; cryolite about 4%; boric anhydride 14%; zinc oxide about 14%; and zirconia about 15%.

CHARLES J. KINZIE.